United States Patent [19]
Maier et al.

[11] Patent Number: 4,543,866
[45] Date of Patent: Oct. 1, 1985

[54] TABLE SAW OUTFIT

[76] Inventors: Peter Maier, Gerokstrasse 1, D-7311 Neidlingen; Albert Sigel, Scholderplatz 21, D-7315 Weilheim, both of Fed. Rep. of Germany

[21] Appl. No.: 572,540

[22] Filed: Jan. 20, 1984

[30] Foreign Application Priority Data

Jan. 26, 1983 [DE] Fed. Rep. of Germany ....... 3302482

[51] Int. Cl.⁴ .............................................. B27B 5/16
[52] U.S. Cl. .................. 83/471.3; 83/477.2; 83/485; 83/581; 83/859
[58] Field of Search ............. 83/467 R, 467 A, 471.2, 83/471.3, 477.1, 477.2, 478, 485, 487–489, 581, 859, 698–700

[56] References Cited

U.S. PATENT DOCUMENTS

| 3,186,452 | 6/1965 | Magnussen | 83/574 X |
| 3,289,713 | 12/1966 | Herzog | 83/477.2 |
| 3,456,697 | 7/1969 | Rutzebeck | 83/471.2 |
| 3,830,130 | 8/1974 | Moore | 83/471.2 |
| 3,968,712 | 7/1976 | Duncan | 83/477.2 |
| 4,133,237 | 1/1979 | Lewin | 83/467 R |
| 4,270,427 | 6/1981 | Colberg et al. | 83/477.2 |
| 4,292,870 | 10/1981 | Mericle | 83/485 |
| 4,350,193 | 9/1982 | McCambridge | 83/477.2 |
| 4,418,597 | 12/1983 | Krusemark | 83/478 |

Primary Examiner—James M. Meister
Assistant Examiner—John L. Knoble
Attorney, Agent, or Firm—McGlew and Tuttle

[57] ABSTRACT

A saw table outfit is made up of a table frame manufactured using lengths of aluminum section. There is a base plate mounted on the frame for supporting a power saw. In the base plate there is a gap or hatch which is covered by a plate with a slot in it for the blade of the power saw. Under the base plate stop and guide elements for the power saw are formed by the material of the plate. The plate and hatch are formed with plural interlocking teeth and the relative position between the plate and hatch can be changed by selecting which teeth of the plate and hatch to interlock.

31 Claims, 16 Drawing Figures

TABLE SAW OUTFIT

BACKGROUND OF THE INVENTION

The present invention relates, in general to table saw outfits and in particular to such an outfit having an electric power saw on a table frame.

Such table saw outfits are used for cutting workpieces that are placed on the table, moved up against the blade of the power saw and then cut.

GENERAL OVERVIEW OF THE PRESENT INVENTION

One purpose of the present invention is that of designing a saw table that is very sturdy and which may be fitted with a large number of different designs of saws.

A further purpose of the invention is that of designing a saw outfit that is largely made up of standard stock.

An even further purpose or object of the invention is that of designing a saw table outfit that may be manufactured at a low cost and furthermore may be used with a large range of workpiece sizes.

A further purpose the invention is to make possible a saw table outfit that may readily be taken apart and in other respects is so made that, to the user, the different operations and manipulations needed for operation of the saw seem to be natural or at least readily learned and not unnatural or awkward.

For effecting these and other purposes of the invention that will become clear on reading further parts of the present specification, a saw table outfit has a table frame made up of section or girder elements and a base plate designed to be fixed thereon and having a power saw thereon, the base plate having a saw blade gap and a slotted cover plate for shutting off said gap in part, the base plate being sectioned on its underside in the form of a stop and guide structure for the power saw.

This design of the saw table is responsible for a number of useful effects, one of which is the use of section elements for making the table frame. Such section elements are standard stock which may be used simply and at a lower price for running off a large number of tables. The form of the top parts of the sections may be used as a simple form of rail on which the different fixtures of the saw may be slid and locked in position as desired. Such fixtures may be for example the carriage supporting the saw, a saw guard and support, stops, work holders and other fixtures as well. Furthermore the use of a base plate in the form of a length of section makes the saw outfit more readily adapted to different purposes, the base plate being designed so that its position may be changed round as desired and then fixed in the desired position.

Further developments of the invention are covered by the claims.

Further details of the invention will be seen from the working example that is made clear in the figures herein.

DETAILED ACCOUNT OF THE WORKING EXAMPLE OF THE INVENTION

Figure 1:
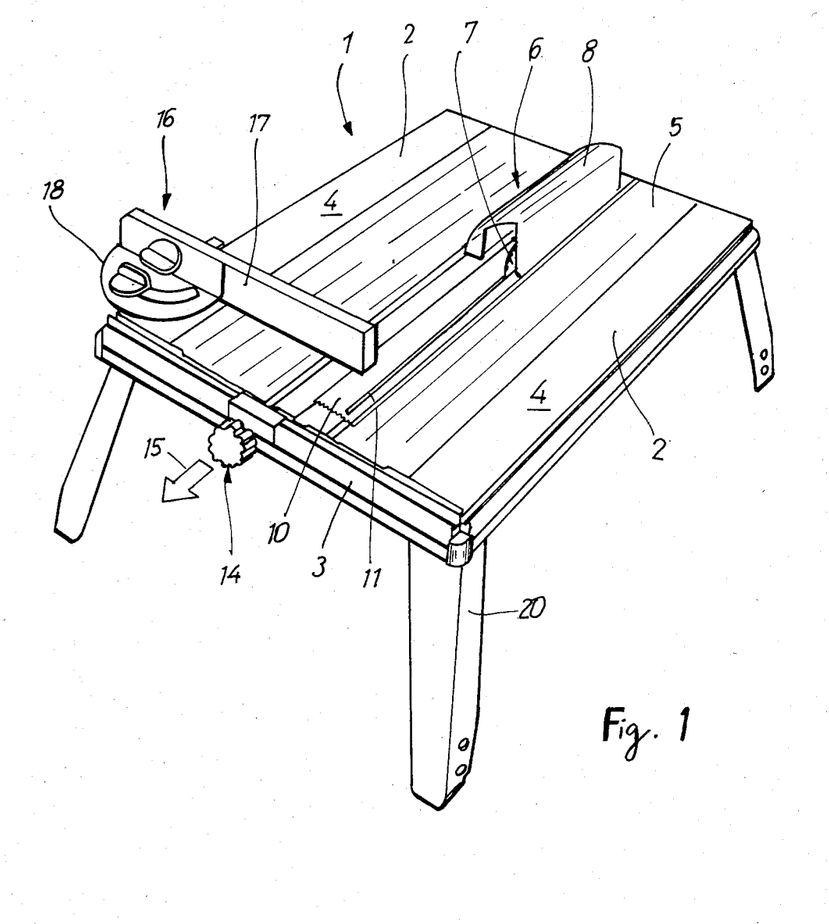
FIG. 1 is a perspective view of a saw table outfit in keeping with the present invention.
Figure 2:
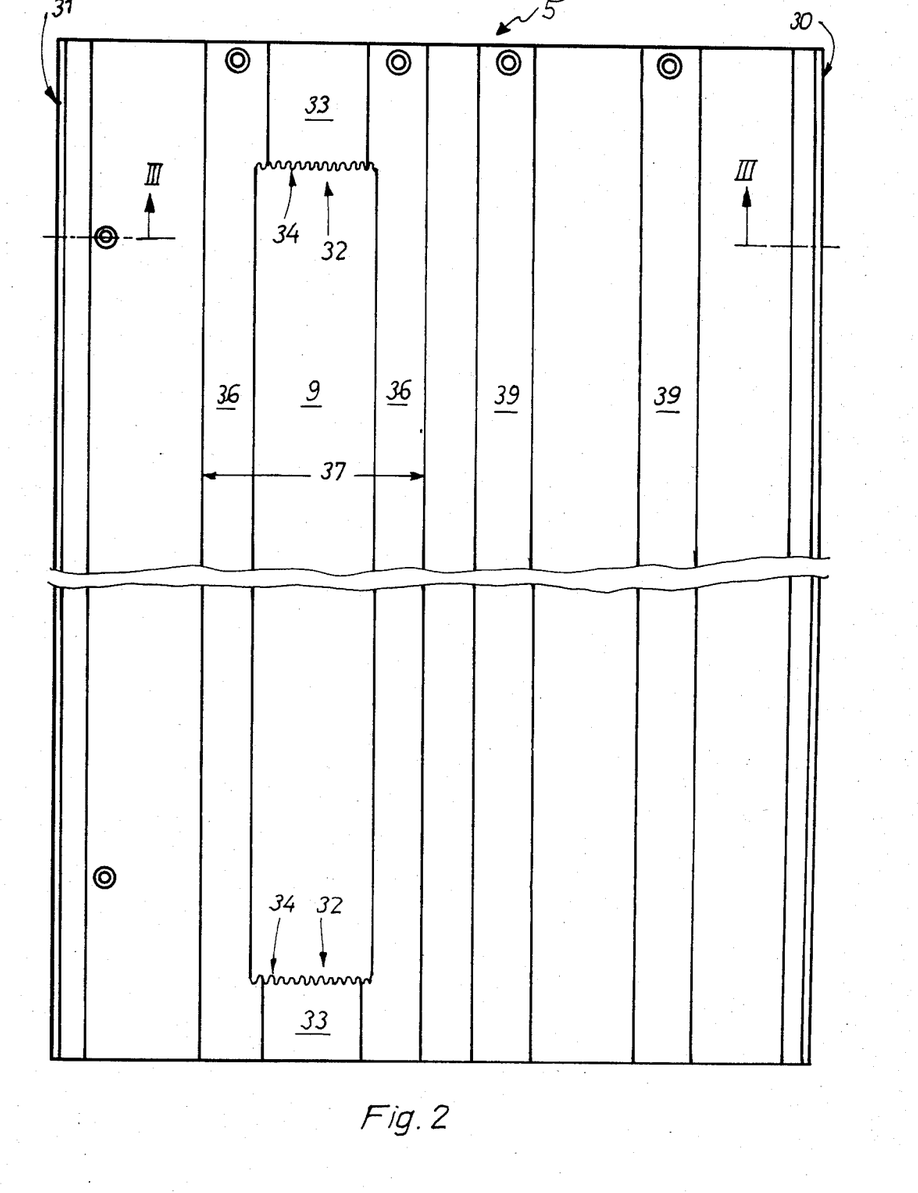
FIG. 2 is a plan view looking down on the base plate of the saw table.

Firstly turning to FIG. 1 the reader will be able to see a saw table 1, that has a table frame made up of section elements or pieces of section stock. It will be seen that there are two opposite lengthways sections 2 that are joined together by cross sections 3, that is to say pieces of section running in the cross or transverse direction. The tops or webs 4 of the lengthways sections 2 are markedly broader than the webs of the cross sections 3. As will be made clear in some detail further on in the present account, the section webs 4 and the top face of the base plate 5 as supported between the lengthways sections 2 are in a common table plane, the base plate 5 functioning as a means for supporting and guiding a power saw 6, that in the present example is a circular saw, although the invention is not limited to such a form of power saw, and whose saw blade 7 will be seen running in an upward direction through and from the base plate 5. And furthermore the blade 7 will be seen to have a guard 8 placed over it. There is a gap 9 or narrow opening in the base plate 5 for the saw blade 7 (FIG. 2). It will be seen from FIG. 1 that this gap is covered over by a cover plate 10 that itself has a slot 11 lined up with the gap 9 thereunder so that the saw blade 7 may be taken up in the slot 11 as well. The saw 6 is supported by a carriage 12 (FIG. 3), of which a more detailed account is to be given, for supporting it so that it may be run backwards and forwards in the direction of the slot 11. The saw is moved by hand using a pull rod 13 with a knob 14 on its outer end (FIGS. 10 and 11), its direction of motion out of the saw table 11 being marked by arrow 15.

As an example of one fixture that may be used with the saw table outfit or apparatus, a stop 16 will be seen in FIG. 1, that has a rocking guide rail 17 thereon. The stop 16 is kept in place by a joint body 18 running on the lengthways section 2 that is furthest from the reader so that the stop may be moved along in the length direction of the table. In addition to or in place of the stop 16 other fixtures may be mounted on the sections 2 and 3, as for example tool supports, supports for a saw blade guide and other fittings. Lastly the reader will be able to see in FIG. 1 a preferred design of the legs 20 of the saw table 1 such that the legs 20 are directed downwards and outwards from the sections 2 and 3 and the area as staked out by the lower ends of the legs 20 on the floor is larger than the area of the table top. It is more specially preferred for the table legs 20 to be so placed that their vertical projection is in each case onto a bisector of the reflex or outer angle between a cross section 3 and a lengthways section 4 at the corner of the table where the leg is placed. This makes the saw table very stable.

Turning next to FIG. 2 the base plate 5 of the saw table 1 will be seen in plan view. The base plate 5 has a rectangular form. It is joined to the lengthways sections 2 at its side edges 30 and 31. It will be seen that the gap 9 for the saw blade 7 is near the middle of the base plate 5, the gap 9 stretching along nearly the full length thereof. The ends 32 of the gap 9 have structures 33 with teeth 34 running right the way across the full width of the ends 32. In the present example the teeth are rounded and may be fitted into teeth 35 at the ends of the cover plate 10, that is to be seen in FIG. 4, for shutting off the gap 9 in the base plate 5. The presence of these teeth 34 and 35 makes it possible for the cover plate to be put on in a number of different positions across the breadth between two shoulders 37 (see furthermore FIG. 3) on the sides of the lower parts 36 of the base plate. The distance between the shoulders 37 and the breadth of the cover plate 10 is such that in all its possible tooth-locked positions the cover plate 10 is completely over the gap 9.

Figure 3:
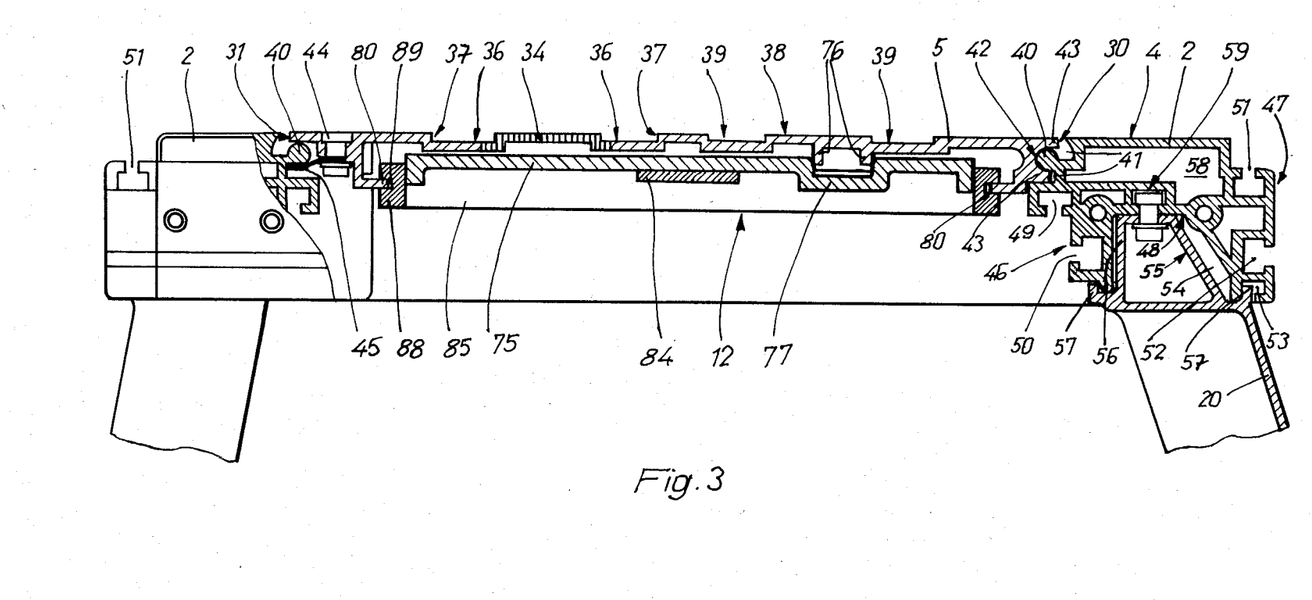
FIG. 3 is a side view of the base plate with a section taken on the line III—III of the FIG. 2 with the base plate in the locked position and with the support of the saw seen supported on a carriage.

The form of the top face of the base plate 5 will be seen in FIG. 3, the line of section of which is kept clear of the teeth 34 so that they are not seen in the figure. It will be seen that the zones 36 on the two sides of the gap 9 are at a lower level than a land 38 of the table. Furthermore there are further wells 39 let into the top face of the base plate that may be used for guiding the guard 8 (see FIG. 1) or other fixtures. The base plate 5 has, as noted, its side edges 30 and 31 resting on the two lengthways sections 2 and in this connection the lengthways sections 2 have steps so that edge guide beads 40 at a lower level than the land 38 of the table are formed. As marked on the right hand side of FIG. 3, the guide beads 40 are between grooves 41 running in the length direction. One edge 30 of the base plate 5 has a well 42 running right the way along it and having a form that is a negative replica of the form of the guide bead 40. The well 42 is open to the side so that the base plate 5 may be slipped into place with the bead 40 in the well 42. The sides of the well 42 are formed by feathers or tongues 43 so placed that the well 42 between them is generally U-like in section. In the locked-on position of the base plate 5, the tongues 43 are taken up in the lengthways grooves 41 of the lengthways section 2. To get the parts into this position the base plate 5 is rocked about the guide bead 40. The base plate 5 is first put in a position in which it is at an angle to the plane of the table as defined by the sections 2 and 3 and moved so that the guide bead 40 is slipped into the well 42, the space inside the grooves 41 being large enough for this to be possible. Nextly the base plate 5 is rocked downwards about the guide bead 40 till its opposite side edge 31 comes to rest on the guide bead 40 matching it on the other lengthways girder 2.

The base plate is locked in this end position by turning a pin 44 through 90° out its axis so that a latch 45 on its lower end comes into a position in the lengthways groove 41 under the guide bead 40. To undo the base plate again it is then only necessary for the pin to be turned back through 90°. In place of the pin with the eccentric latch 45 another form of locking part might be used fitting into the groove in the lengthways section or girder 2. In keeping with a preferred form of the invention the lengthways section 2 on the two sides of the base plate 5 are lengths of the same stock and mounted so as to be bilatarily symmetrical. In addition to making production simpler, this system makes it possible for the base plate 5 to be fixed on the table frame in either of two positions that are spaced by 180° from each other. It will furthermore be seen that the guide beads 40 on the lengthways sections 2 are lower than the plane of the lands 38 of the table by an amount equal to the thickness of the base plate 5. The backs or level webs 4 of the lengthways sections 2 are in the plane of the lands 38 as the top face of the base plate 5. In keeping with a preferred form of the invention the lengthways section 2 has, in addition to the said guide bead 40, flanges of the section 2 form grooves (that are more specially T-grooves or swallowtail grooves) in its inner side 47, outer side 46 and lower side 48, for sliding fixtures such as work supports, stops and other means likely to be needed by the user. In the present case there is a first, downwardly opening T-groove 49 under the guide bead 40 in the inner side 46, and further down and further out from this groove 49 there is a second T-groove 50 opening in an inward direction. On the outer side of the lengthways section 2 there is a third, upwardly opening T-groove 51 that is at a lower level than the web 4. There is then a third T-groove 51 opening upwards and further down there is an outwardly opening fourth T-groove 52 and lastly a downwardly opening L-groove 53 under the groove 52. The lower face 48 of the lengthways section 2 has U-like opening 54 therein, whose lower leg face 55 is sloped downwards and is used as a support face for a head 55 molded on the top end of the table leg 20 so that the leg is kept well locked in place. At the top end of the U-like opening 54 there is a further, downwardly opening T-groove 59, in which the head 56 and other parts are locked by way of a bolt. In the mounted position the leg 20 of the table has angled lips 57 resting on the lengthways section 2, one such lip being fitted into the L-groove 53. To keep down weight, the lengthways section 2 has a number of different spaces 58 within it that are to be seen in detail in the figure. The complex sections 2, 3, 5 and 20 as used in the invention are best made of extruded aluminum.

Figure 5:
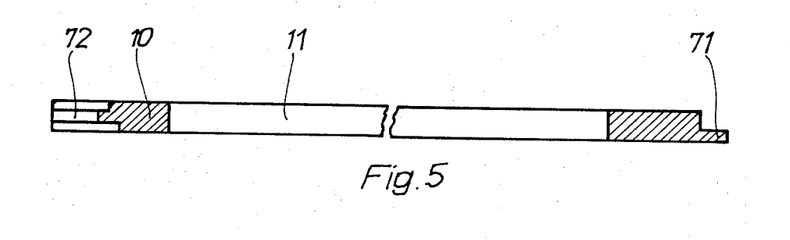
FIG. 5 is a section through the cover plate as taken on the line V—V of FIG. 4.
Figure 6:
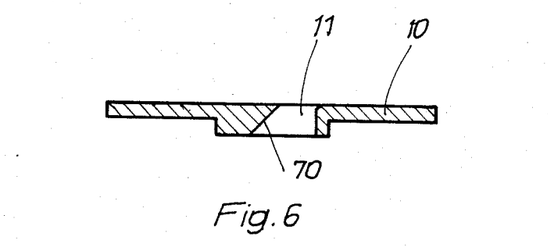
FIG. 6 is a section through the cover plate as taken on the line VI—VI of FIG. 4.

Turning again to FIGS. 4 to 6 the reader will be able to see the cover plate 10 for shutting off the gap 9 in the base plate in part. At its ends the cover plate 10 has the mating teeth 35 for locking into the teeth 34 in the base plate 5 and making it possible for the cover plate to be placed in a number of different positions in small steps equal to the spacing between the teeth. The cover plate 10 has the slot 11 running in its length direction that is lined up with the gap 9 in the base plate 5 when the cover plate is locked in position so that there is an opening for the saw blade 7. Because of the adjustment in a sideways direction as made possible by the teeth 34, the cover plate 10 may be used for a wide range of different saw designs. Furthermore one and the same cover plate 10 may be used for sawing with the blade in an upright position and at a slope. To make a change over between these two different ways of sawing it is only necessary for the cover plate to be offset to be at the position of the saw blade 7 in the base plate 5. In the present working example the cover plate 10 only has one sloping side face 70. But nevertheless the cover plate 10 may be used for cutting operations in which the saw blade is sloped to the one or the other side of the upright plane, because the teeth 34 and the ends of the cover plate 10 are the same so that the plate 10 may be turned through 180° in relation to the base plate about an upright axis, if the sloping face 70 is sloping in the opposite direction to the angle of the saw desired for a given operation.

The cover plate 10 is fixed and locked in position by a locking system acting on the base plate. The system is made up on the one hand of a tonguepiece 71 (right hand end of FIG. 4) on one end of the cover plate 10 that is tucked under one end structure 33 of the base plate 5 when the cover plate 10 is locked in place, while on the other hand there is a turning pin (not in the figure) with a latch at its lower end. This pin is able to be put in a cutout 72 in the left hand end of the cover plate 10.

Figure 4:
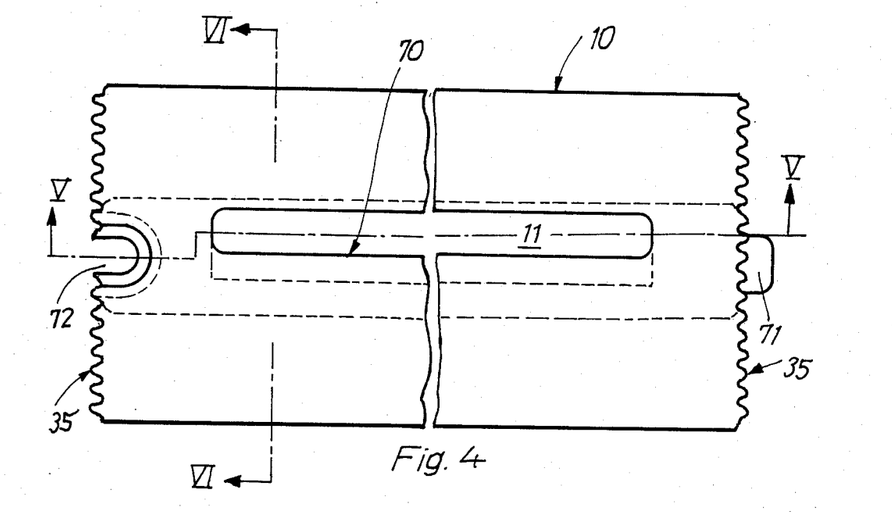
FIG. 4 is a plan view looking down on a cover plate.

For mounting the cover plate 10 in its desired position, it is placed at a slope with the end having the tonguepiece 71 lowermost. The tonguepiece 71 is then tucked under the teeth 34 of the base plate 5 at one end of the gap 9. The two sides of the cover plate 10 are supported on the parts 36 of the base plate 5 on the two sides of the gap 9. The tonguepiece 71 will then be sloping downwards and under the end structure 33. The cover plate 10 is nextly rocked downwards into a level position till the teeth at its other end are locked in the teeth at the other end of the gap 9. The pin is then turned so that the lever or latch at its lower end is moved into place under the end structure 33 and the cover plate 10 is locked in position.

It will furthermore be seen from FIG. 3 that a further development of the invention the under part of the base plate 5 is in the form of a guiding and stop structure designed for use with a saw that is to be fixed in one position on the base plate 5 of the table and when a saw 6 is used that is able to be moved along in translation. In the first case it is best to have sprags (not in the figure) for keeping the saw in place under the base plate 5. In the case of the use of a moving or traveling power saw it will be seen from FIG. 3 that there is a carriage 12 guided and supported by way of the guiding and stop structure under the base plate 5. The carriage 12 has a support plate 75 forming the foot of the saw 6 that is generally arrowed in FIG. 1 but is not to be seen in FIG. 3. The design is such that the saw 6 may be moved along on the carriage in the length direction of the gap 9.

The carriage 12 is supported and guided by way of two parallel rails 80 formed on the the lower side of the base plate. The rails 80 are so formed near the edges 30 and 31 of the base plate 5 that they are at a lower level than and generally parallel to the area of the plate 5 in the space between the lengthways sections 2, said rails 80 fitting with play into the grooves 89 in shoes 88 forming parts of the carriage 12 (see furthermore FIG. 7). In this way the carriage 12 is supported at the desired level on the rails 80 for running backwards and forwards under the base plate 5. Because of the play present the carriage is able to be moved sideways somewhat in relation to the rails 80.

The support plate 75 of the saw 6 is kept in place by one or more mounting plates 84 on the carriage 12 so that the saw 6 is kept at the desired level or height. In this respect the support plate 75 is placed between the carriage 12 and the base plate 5 and is guided in the lengthways direction by a guiding structure on the lower side of the base plate 5. In the present case this guiding structure is made up of parallel lips 76 running down from the lower side of the base plate 5. The carriage 12 is so kept in position on the rails 80 at some distance from the base plate 5 that its parts, of which an account is to be given, are able to be moved along under the lips 76. The carriage 12 and the saw 6 with the support plate 75 are positively guided in the sideways direction on the lips 76. To this end the support plate 75 has a well 77 into which the lips 76 are fitted so as to make running contact for guiding the carriage in a direction normal to the plane of FIG. 3. It will be noted that in this system the saw 6 is guided in vertical and sideways directions by the special cross section of the base plate 5.

Figure 7:
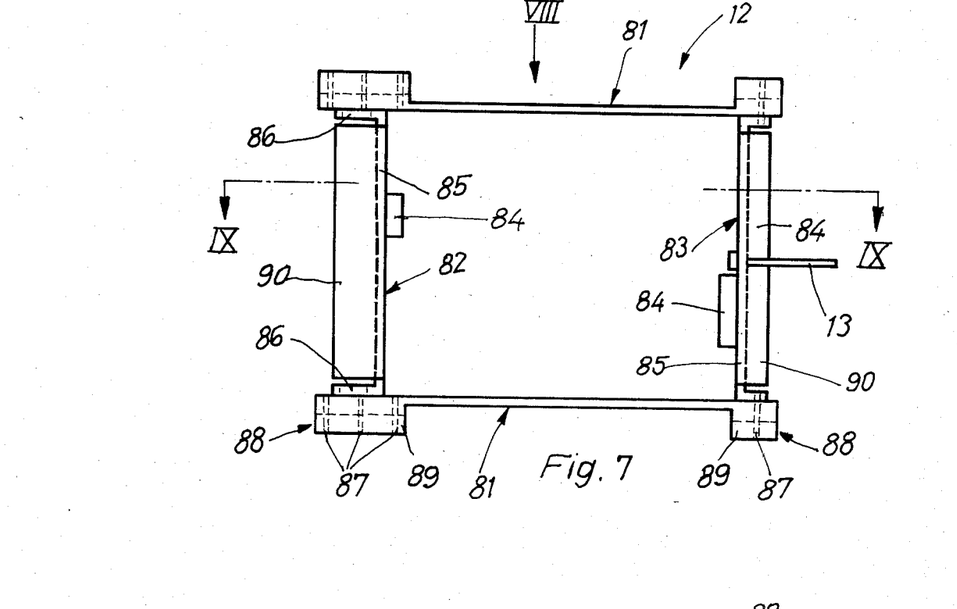
FIG. 7 is a plan view of the carriage functioning as a saw support.
Figure 8:
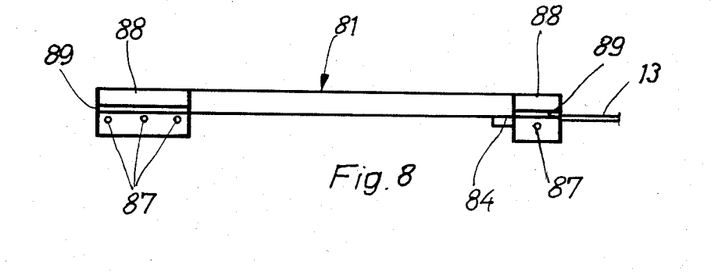
FIG. 8 is a side view of the carriage looking in the direction VIII as marked in FIG. 7.
Figure 9:
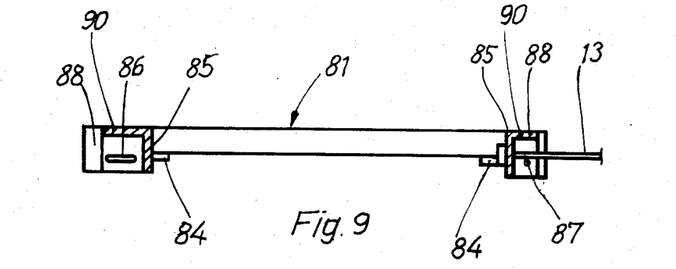
FIG. 9 is a section through the carriage as taken on the line IX—IX of FIG. 7.

One possible form of the carriage 12 for a traveling power saw 6 will now be made clear in some detail using the FIGS. 7 to 9 herein. The carriage 12 is made up of a frame that may be adjusted in height and in which the support plate 75, forming the foot of the saw 6 may be clamped. The frame is generally rectangular. It is made up of two lengthways girders 81 and two cross girders 82 and 83, that are placed opposite each other in pairs and are joined together at their corners. The cross girders 82 and 83 have tongue-like support bars 84 for the support plate of the saw 6. In order to keep the saw 6 at the desired level the cross girders 82 and 83 are generally L-like with the one arm 85 of the letter L having the support bar 84 thereon and forming a stop face for an angled edge of the support plate 75, that takes up a position between the arms 85 and is upright in relation to the support bar 84. The other arm or flange 90 of each of the girders 82 and 83 is at the same level as the top edge of the carriage 12 to keep the right position in relation to the base plate 5. To make possible for the carriage to be matched to different regular or standard sizes of support plates of power saws at least one of the cross girders 82 may be moved along in the lengthways girders 81 and locked at any desired position thereon, this making it possible for the carriage 12 to be locked in relation to the support plate 75 in a specially simple way. In the present working example of the invention the back cross girder 82 has slots 86 in its ends, through which screws are placed for connection with the lengthways girders. This makes it possible for the cross girder 82 to be adjusted in position within a range equal to the length of the slots 81. Furthermore the lengthways girders 81 have a number of spaced assembly holes 87 to take up such screws fitting into the said slots. After the carriage 12 has been put together with the right size, the screws are done up tight. The lengthways girders 81 and/or the cross girders 82 and 83 of the carriage 12 may have latches, nosepieces and the like, that are not figured here in detail, for gripping round parts of the support plate 75 (that is fixed to the saw 6) to keep it firmly in position.

In keeping with a preferred form of the invention there are the separate shoes or rails 88 as noted hereinbefore on the outer sides of the lengthways girders 81 so that the carriage 12 is supported on the base plate for motion in the length direction. Again as noted earlier these shoes 88 on the ends of he lengthways girders 81 have grooves 89 therein for running on the rails 80 formed part of the base plate 5. By having separate, spaced-out shoes 88 the carriage is made more freely running and less material is needed for manufacturing it. For moving the carriage along the rails 80 by hand there is the pull rod 13, that is mounted on the front cross girder 83 and may be locked in relation to the frame of the table in a way to be detailed hereinafter. The carriage 12 is moved against the form of one or more return springs that are each fixed to the carriage 12 at one end and to the frame of the table at the other.

For locking the pull or draw rod 13 in position in relation to the frame of the table there is a guide head. One possible design thereof is to be seen in FIGS. 10 and 11. The guide head is made up of a support 101 able to be fixed to one section 2 or 3 of the table frame and which has a form matching the form of the section in question. More specially the support 101 may be L-like, although this is not to be seen in the figure. A sleeve 102 is formed on the support 101 to take up the pull rod 13. The pull rod 13 is guided in the space 103 and 104 inside the sleeve 102. The right hand end of the spade 103 and 104 can be seen in FIG. 11 to have the form of an upright slot. The other end of the space 103, 104 at the back wall 106 of the sleeve 102 has the same form as this in its lower part, but at its top part has two corners. This form of the space 103 and 104 makes it possible for the pull rod 13 to be moved in an upright direction in the sleeve 102. The pull rod 13 is acted upon by a loading spring in the upright direction. In the present working example this spring is in the form of a metal strip 107 plugged into the sleeve 102 over the pull rod 13. To keep the spring strip 107 in place the top wall 108 of the space 103, 104 in the sleeve 102 has a cutout 109 into which a head 111 of the S-like strip 107 is plugged so that said head is to the outside of he sleeve, whereas the main body 110 of the strip 107 is within the sleeve 102.

Figure 10:
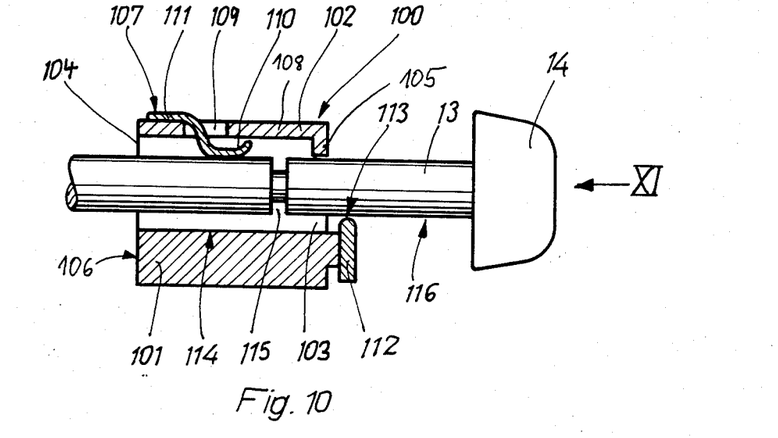
FIG. 10 is a side view of a support with a pull-rod therein for operation of the carriage, as taken on the section X—X of FIG. 11.
Figure 11:
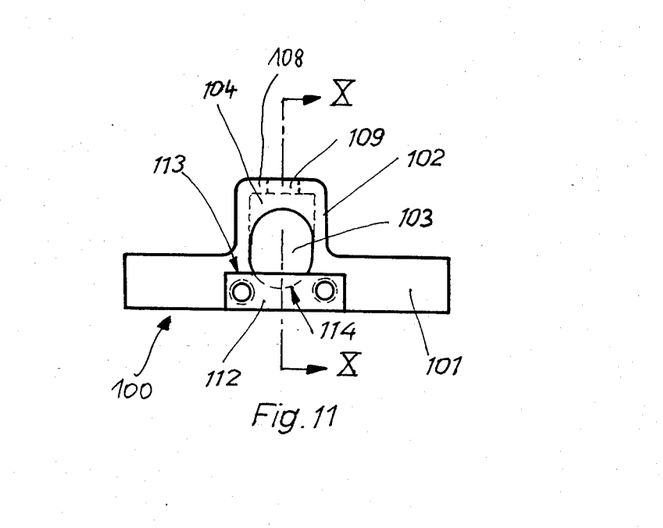
FIG. 11 is an end-on view of the bearing by itself looking in the direction XI as marked in FIG. 10.

The pull rod 13 is locked in position by way of a plate 112 that is screwed onto the end 105 of the sleeve 102. The top edge 113 of the plate 112 is higher up than the lowest part of the space 103 and 104 so that the pull rod 13 is in fact supported on the edge 112 of the plate and not on the lower part 114 of the space 103. The pull rod 13 has a ring groove 115 cut into it for functioning with the edge 112 in locking the pull rod in position.

If the pull rod 13 is moved out of the sleeve 102 so far that the ring groove 115 is over the edge 112, the pull rod 13 is pushed down by the spring strip 107 into a locked position with the edge 112 in the groove 115. The space 103 and 104 makes it possible for the pull rod 13 to be moved downwards. For unlocking the pull rod 13 from the edge 112, it is lifted and moved along axially a small distance so that the plate 112 is no longer in the groove but resting on the outer face 116 of the rod. For making certain that the pull rod is kept in the locked position the guide head 100 may have a turning latch (not in the figure) for example that may be rocked downwards into the same ring groove 115 or into a second ring groove (not marked in the figure) on the pull rod so that the last-named is kept in the desired end position thereof and there is no chance of its slipping out of position by some chance effect.

Figure 12:
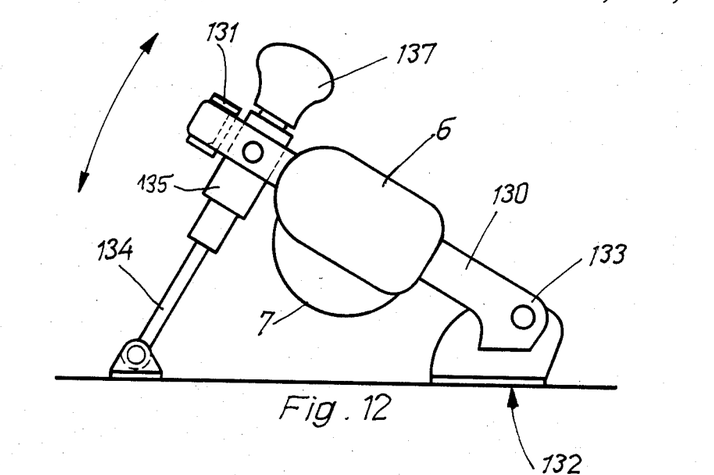
FIG. 12 is a diagrammatic side view of a means for adjustment of the depth of cut.

In keeping with a further development of the present invention the saw 6 may be put at a slope so that its saw blade 7 is then at an angle and furthermore the depth of cut may be changed. A preferred form of depth adjustment means is to be seen in FIGS. 12 and 13. In FIG. 12 the saw 6 will be seen to be mounted on a lever 130 with a handle 131. At the end thereof opposite to the handle 131 the lever 130 is rockingly joined to a support plate 132. The fulcrum point of the lever 130 or of the saw 6 is marked 133. Near the handle 131 the lever 130 is supported by a threaded rod 134 on the support plate 132 at a point thereon at some distance from the fulcrum point 133 of the saw 6. The lever 130 is joined to the threaded rod 134 by way of a sleeve 135 so as to make rough and fine adjustment possible as will now be made clear.

Figure 13:
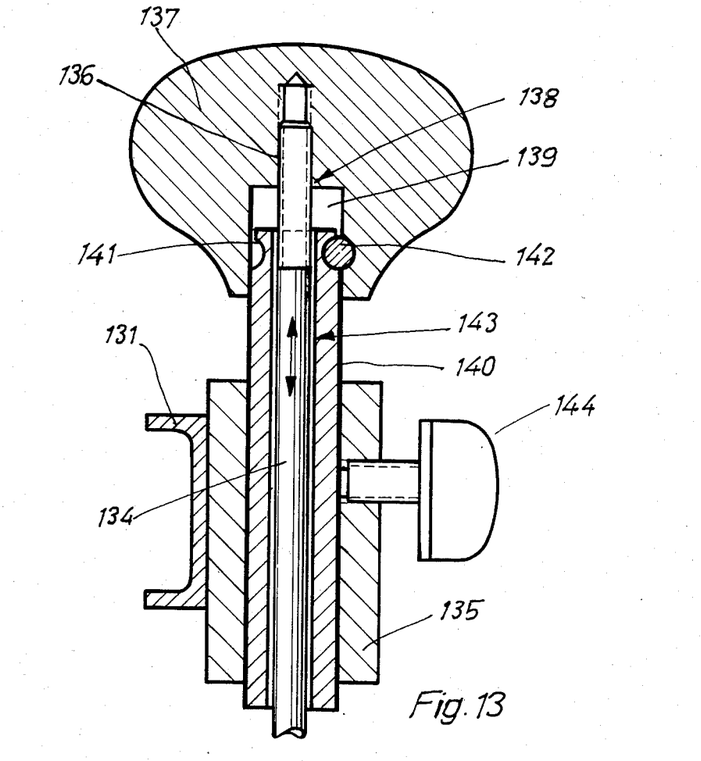
FIG. 13 is a lengthways section of part of the means to be seen in FIG. 12.

The rod 134 is only threaded at its top end at 136 so that a handle 137 for adjustment may be fixed thereon by screwing the top end of the rod into the inner end of the counter-bored hole 138 where such hole is threaded for fitting the top end of the rod 134. The wider, lower part 139 of the counter-bored hole 138 takes up a cylindrical sleeve 140 so that it may be turned in relation thereto. The bundle 137 is kept on the sleeve by a pin 142 fixed to the handle 137 and taken up in a round groove 141 in the outer face of the top end of the sleeve. In place of a pin 142 a circlip (not figured) might be used. The sleeve 140 may be freely turned in the hole 138 in relation to the handle and is locked axially in relation thereto by the pin 142. The hole 143 in the sleeve for the rod 134 is of such a size that there is some play between the rod and the sleeve. The further sleeve 135 is placed round the inner sleeve 140 under the adjustment handle or knob so that there is a connection between the lever 130 supporting the saw 6 and the rod 134. The outer sleeve 135 may be locked and clamped on the inner sleeve 140 by way of a hand wheel 144 and it is for its part fixed with play on the lever 130 supporting the saw 6, the lever 130 being for example forked to make this possible.

The system so far noted for adjustment of the depth of cut of the saw 6 is firstly adjusted roughly to the cut depth using the wheel 144 that is undone somewhat so that the outer sleeve 135 may be slid on the inner sleeve 140 till the lever 130 is at the right angle. Nextly the adjustment wheel 144 is done up tight and the sleeve 135 is so locked onto the inner sleeve 140. For the fine adjustment of the depth of cut the adjustment handle 137 may then be screwed inwards and outwards so that the rod 134 is screwed into or out of the adjustment handle 137, whichever is desired. In this respect the turning motion of the adjustment handle is turned into an axial motion making possible fine adjustment because of the mechanical advantage given by the pitch of the screw 137. The sleeve 140 is moved along with the adjustment handle 137 but it is not turned thereby so that only the axial motion of the adjustment handle 137 is transmitted to the outer sleeve 135 and for this reason to the lever 130 joined thereto.

In connection with the system for changing the slope of the blade 7 of the saw 6 for making angle cuts, the saw table 1 in keeping with the present invention has a saw guard holder 19 that may be put at a slope as well. An account of one possible form of such a saw guard holder 19 will now be given using FIGS. 14 to 16. The saw guard holder 19 is kept in place by way of an anglepiece 160 on the outer side of the table frame using one of the cross sections 3. The inner arm of its two arms 161 and 162 of the anglepiece 160 is rested against the cross section 3.

Figure 14:
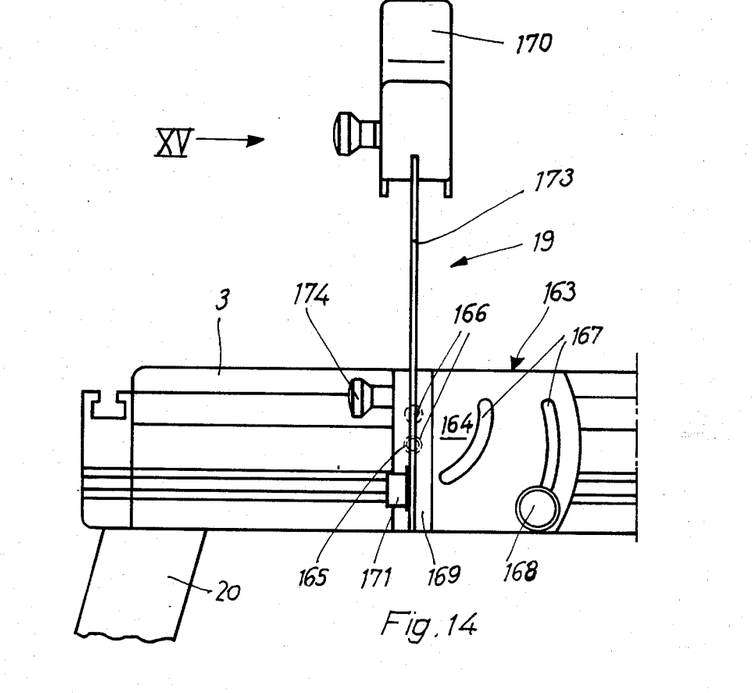
FIG. 14 is a front view of the saw guard support.

For locking it in place on the cross section 3 or girder, fixing means of the right design may be used, as for example means fitting into a lengthways groove in the cross section 3 and making it possible for the anglepiece 160 to be moved along the cross section 3. On the anglepiece 160 a second anglepiece 163 is joined so that it may be turned and locked in place as desired. One arm 164 of the second anglepiece 163 comes up against the outer face of the cross section 3, to which it is joined by way of a pin 165. In FIG. 14 the reader will see that there are in-line holes 166 in the arms 162 and 164 to make possible two positions of the pin 165 for different forms of power saw 6. The turning motion of the second arm 163 about the pin 165 is limited in angle because there are curved slots 167 centered on the pin 165, there being one slot for each of the pins so that the two curved slots 167 have their own centers for the rocking motion of the saw guard holder 19. There is a screw 168 with a head that has its threaded shank screwed into the arm 162 of the first anglepiece 160. In the done up condition the head of the screw 168 is responsible for a force on the second anglepiece 163 so that is is locked against the first anglepiece 160. If on the other hand the headed screw 168 is undone, the anglepieces 160 and 163 may be rocked in relation to each other through an angle that is dependent on the size of the one or the other curved slot 167. Which of the holes 166 the pin 165 is put in and which of the curved slots the screw 168 is put in is dependent on the sort of saw 6. Only one of the holes 166 and only one of the curved slots 167 is used at a time.

Figure 15:
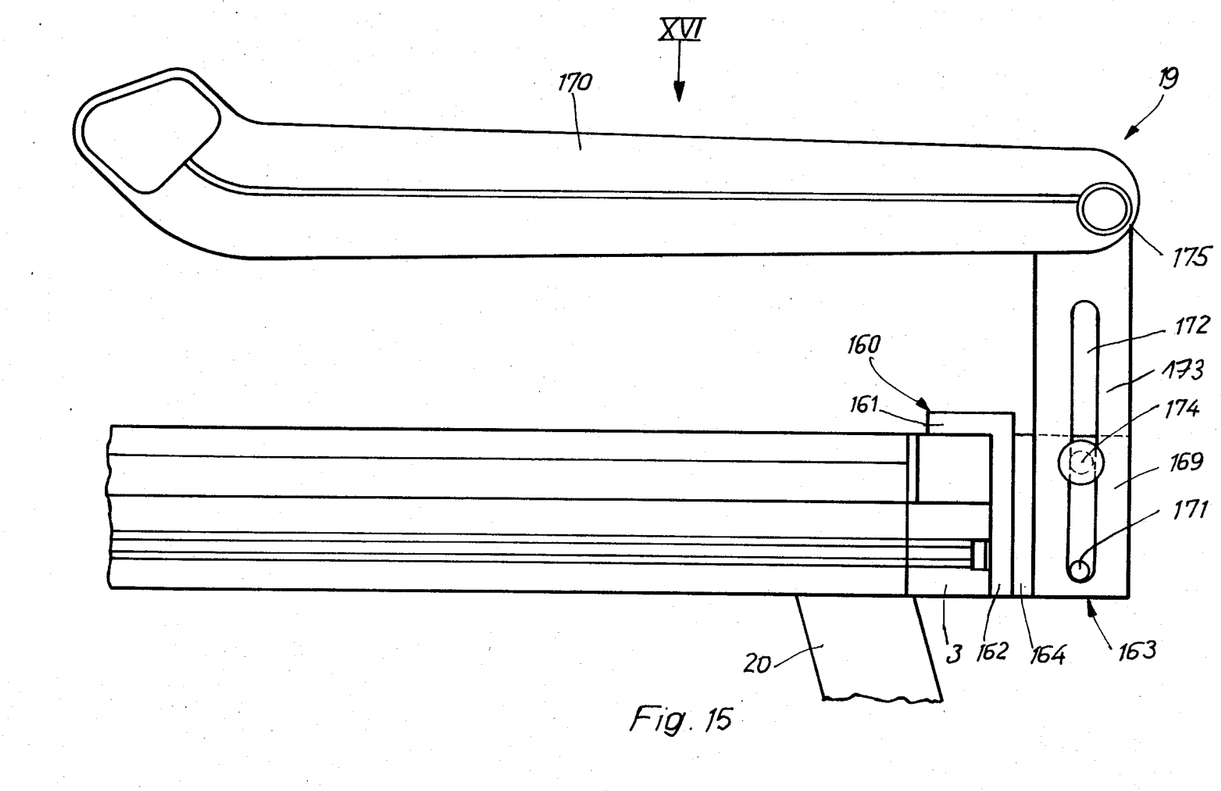
FIG. 15 is a side view of the saw guard support looking in the direction XV as marked in FIG. 14.
Figure 16:
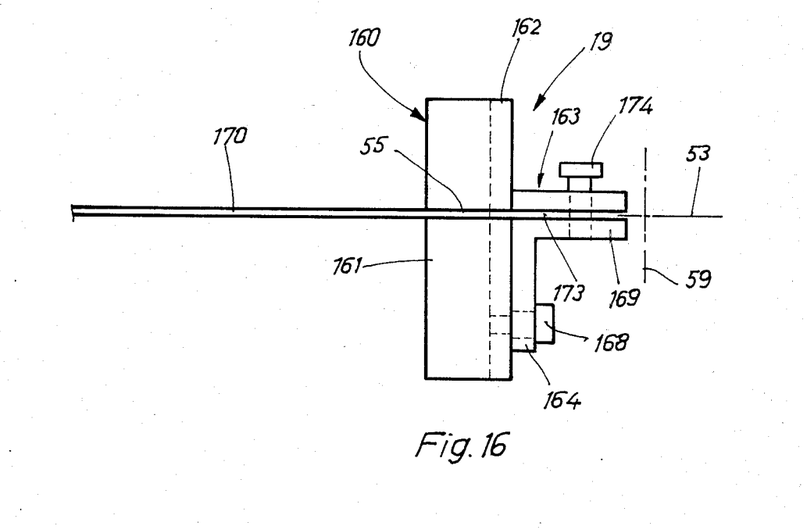
FIG. 16 is a view of the saw guard support looking in the opposite direction to the direction XVI as marked in FIG. 15.

As noted the arm 164 of the second anglepiece 163 may be turned in relation to the first anglepiece 160 so as to keep up with rocking motion of the saw 6. The second arm 169 of the second anglepiece 163 is used as a support for the saw guard 170. The saw guard 170 may be rocked upwards and downwards in the plane of the saw blade 7 for adjustment of the height over the saw. To make possible such adjustment in height a pin 171 is fixed to the arm 169 and the pin is taken up in an upright slot 172 in an upright arm 173 of the saw guard 170. The arm 173 may be slid in relation to the pin 171 and turned about it. For locking the saw guard at the desired height there is a locking pin 174, that is fitted through the slot 172 and is taken up in a hole in the arm 169. After undoing the locking pin 174 the saw guard 170 may be rocked about the pin 171 in the plane of the saw blade 7. In order to make possible further motion of the saw guard there is a turnpin joint 175 at the top end of the arm 173 for making a join between same and the saw guard 170 for rocking same upwards and downwards over the saw blade 7. It will be seen that one and the same saw guard 170 and saw guard holder 19 may be used for different designs of saw and for the saw guard 170 to keep up with a change in angle or change in depth of cut of the saw 6.

It is to be noted that the head of the pin 44 and of other locking means used in the invention may have a wide slot so that it may be turned at any time not only by a screwdriver but by using a coin, that the user is likely to have in his pocket.

We claim:

1. A saw table outfit comprising a table frame, a power saw with a blade supported on said table frame, said table frame being made up of section elements, a base plate fixed on said section elements, said power saw having its blade running through a gap in said base plate, and a cover plate for shutting off said gap in said base plate, said base plate having ends with teeth therein and a lower side with stop and guide means in the cross section thereof for said saw, ends of said gap being toothed and interlocked with said teeth formed on the ends of said cover plate so that said cover plate may be moved into a number of different positions across the width thereof with said teeth interlocking.

2. The saw table outfit as claimed in claim 1 wherein at least one of said section elements has a rounded guide bead placed at a lower level than a top face of said base plate, said bead being placed between flanges formed on said element, at least one side of said base plate having a well therein answering to the form of the said bead for fitting thereon.

3. The saw table outfit as claimed in claim 2 wherein said well is placed between tongues formed on said base plate which are fitted into grooves in the section on rocking the base plate about the bead.

4. The saw table outfit as claimed in claim 3 having two such parallel beads on two sides of the base plate, the base plate having a tongue on one side for locking under one such bead on rocking the base plate about same, and on the opposite side thereof the said base has a turning pin with a latch for locking under said other said bead.

5. The saw table outfit as claimed in claim 1 comprising means supporting said base plate in a position in which a top face thereof is lined up with a top face of at least one of said section elements.

6. The saw table outfit as claimed in claim 1 wherein at least one of said section elements has grooves on inner, lower and outer sides thereof for fixtures that are designed to be locked in such grooves.

7. The saw table outfit as claimed in claim 1 wherein in said different positions of said cover plate, said cover plate is supported on parts of the said base plate to the two sides of said gap, said cover plate having a slot therein lined up with said gap.

8. The saw table outfit as claimed in claim 7 wherein said slot in said cover plate has at least one side that is at an angle the vertical.

9. The saw table outfit as claimed in claim 8 wherein at one end thereof said cover plate has a tonguepiece for fitting under said base plate and at an opposite end thereof it has a turning pin with a latch that may be turned into a locking position under said base plate.

10. The saw table outfit as claimed in claim 9 comprising at least one sprag for fixing said saw on said base plate and making it possible for the said saw to be taken off said base plate when desired.

11. The saw table outfit as claimed in claim 1 comprising a carriage placed under said base plate and supporting said saw, said saw comprising a support plate that is supported on said carriage.

12. The saw table outfit as claimed in claim 11 comprising at least one rail formed on a lower part of said base plate on which said carriage is supported so that it may be moved in translation clear of the said base plate.

13. The saw table outfit as claimed in claim 12 wherein said carriage has at least one support face for the support plate on which said support is supported between the carriage and the base plate.

14. The saw table outfit as claimed in claim 13 wherein said base plate has guide means on a lower side thereof for guiding the carriage in the direction of cutting of the said saw.

15. The saw table outfit as claimed in claim 14 wherein there is at least one lip running down from the lower face of the base plate into a groove in the support plate for guiding said support plate.

16. The saw table outfit as claimed in claim 11 wherein said carriage comprises a carriage frame that may be adjusted in size and in which the support plate of the saw may be locked.

17. A saw table outfit comprising a table frame, a power saw with a blade supported on said table frame, said table frame being made up of section elements, a base plate fixed on said section elements, said power saw having its blade running through a gap in said base plate, and a cover plate for shutting off said gap in said base plate, said base plate having ends with teeth therein and a lower side with stop and guide means in the cross section thereof for said saw, said saw table outfit including a carriage placed under said base plate and supporting said saw, said saw comprising a support plate that is supported on said carriage, said carriage comprising a carriage frame that may be adjusted in size and in which the support plate of the saw may be locked and wherein said carriage frame is rectangular and comprises lengthwise girders and cross girders joining said lengthwise girders together at ends thereof, at least one of said cross girders being able to be locked in different positions on said lengthwise girders.

18. The saw table outfit as claimed in claim 17, wherein said cross girders have a generally L-like form and are screwed in position on said lengthwise girders using holes therein, said lengthwise girders further having guide shoes on outer sides thereof, said base plate having at least one rail, said shoes having grooves therein for taking up said at least one rail.

19. The saw table outfit as claimed in claim 18 wherein said cross girders have support faces for said support plate.

20. The saw table outfit as claimed in claim 19 comprising a return spring and a pull rod that may be locked in at least one axial position thereof, said rod being joined to said carriage so that said carriage may be moved along in translation on the base plate while loaded by a return spring.

21. The saw table outfit as claimed in claim 20 comprising a support head mounted on one said section elements, said head having a guide space therethrough to take up said rod and further having a plate with an edge that is take up lockingly in a ring groove in said rod.

22. The saw table outfit as claimed in claim 21 wherein said head has spring strip therein, one end of said spring fitting into an opening in said head, said spring strip acting against one side of said rod and keeping it against said plate, said spring furthermore being able to be moved clear of said rod for so that said rod may be unlocked from said plate.

23. The saw table outfit as claimed in claim 1 wherein said saw may be adjusted as to slope in relation to an upright plane, said outfit further comprising means for adjustment of depth of cut of said saw.

24. The saw table outfit as claimed in claim 23 comprising a lever for supporting said saw for rocking said saw about a fulcrum point, and a threaded rod supporting said saw at point spaced from said fulcrum point on a lever, said threaded rod being able to be adjusted for fine and rough adjustment of said saw.

25. The saw table outfit as claimed in claim 24 comprising an adjustment handle screwed on said rod, a inner sleeve fixed axially in relation to said handle but able to be turned in relation thereto, and an outer sleeve placed round said inner sleeve, said outer sleeve being able to be locked in said lever at different axial positions of said outer sleeve in relation thereto.

26. The saw table outfit as claimed in claim 23 further comprising a saw guard and a saw guard holder that may be put at different of positions of slope in relation to the vertical, said guard furthermore being able to be rocked upwards and downwards in the plane of said saw blade for adjustment in height.

27. The saw table outfit as claimed in claim 26 wherein said holder has rockingly joined together first and second anglepieces so placed that one arm of said first anglepiece is fixed against one said section element of said table frame whereas one arm of said second anglepiece is joined to a second arm of said first anglepiece so that it may be rocked in relation thereto, said outfit further comprising a support pin on a further arm of said second anglepiece, and a holder arm holding said saw guard, said holder arm being slidingly mounted on said support pin.

28. The saw table outfit as claimed in claim 27 wherein in the arm of the second anglepiece resting against the first anglepiece there is at least one curved slot centered on an axis of rocking of said saw and of said saw guard holder, the outfit further comprising a headed screw in said curved slot and screwed into said first anglepiece for locking said second anglepiece in place.

29. The saw table outfit as claimed in claim 28 having at least two alternate fulcrum means for defining the axis of rocking of said anglepieces in relation to each other.

30. The saw table outfit as claimed in claim 27 wherein the arm of the second anglepiece having the support pin therein has an opening with a locking pin therein, and said guard may be rocked upwards and downwards over said saw about a turnpin.

31. The saw table outfit as claimed in claim 30 wherein after undoing said locking pin said guard may be rocked about said turnpin in the plane of said saw blade.

* * * * *